US006400548B1

(12) United States Patent
Strohmaier

(10) Patent No.: US 6,400,548 B1
(45) Date of Patent: Jun. 4, 2002

(54) EMI SHIELD

(75) Inventor: Mark Strohmaier, San Francisco, CA (US)

(73) Assignee: Nortel Networks Corporation, Montreal (CA)

(*) Notice: Subject to any disclaimer, the term of this patent is extended or adjusted under 35 U.S.C. 154(b) by 0 days.

(21) Appl. No.: 09/537,223

(22) Filed: Mar. 28, 2000

Related U.S. Application Data

(60) Provisional application No. 60/159,232, filed on Oct. 13, 1999.

(51) Int. Cl.[7] .................................... H02H 1/00
(52) U.S. Cl. .................................... 361/118
(58) Field of Search .................... 361/118; 439/607, 439/567, 439, 676

(56) References Cited

U.S. PATENT DOCUMENTS

| | | | | | |
|---|---|---|---|---|---|
| 4,772,212 | A | * | 9/1988 | Sotolongo | 439/98 |
| 6,196,879 | B1 | * | 3/2001 | Hess et al. | 439/676 |
| 6,217,351 | B1 | * | 4/2001 | Fung et al. | 439/131 |
| 6,250,964 | B1 | * | 6/2001 | Fair et al. | 439/607 |

* cited by examiner

*Primary Examiner*—Edward H. Tso
*Assistant Examiner*—Pia Tibbits
(74) *Attorney, Agent, or Firm*—Trop, Pruner & Hu, P.C.

(57) ABSTRACT

A system includes a circuit board, a modular connector and an EMI shield. The circuit board includes a groundplane and a groundpad that is electrically coupled to the groundplane. The EMI shield includes a first portion to contact and establish an electrically connection with the modular connector. Another portion of the EMI shield contacts the groundpad to electrically couple the first portion to the groundpad to shunt EMI from the modular connector.

24 Claims, 3 Drawing Sheets

EMI SHIELD

This application claims the benefit of U.S. Provisional Patent Application Serial No. 60/159,232, entitled "EMI SHIELD," filed on Oct. 13, 1999.

BACKGROUND

The invention relates to an Electromagnetic Induction (EMI) shield.

EMI poses a serious design challenge to network component design, particularly as supported data throughput rates meet and exceed those specified by the well-known Fast Ethernet (100 Mb/s) and Gigabit Ethernet (1000 Mb/s) standards. EMI is especially problematic where, as a cost-savings effort, "unshielded" cabling and connectors are used to communicate signals that indicate information for high speed local area network (LAN) traffic.

Due to the signal distortion that EMI introduces, EMI can cause data loss within and about the network component exhibiting the same, and can interfere with or otherwise adversely affect the operation of other electronic devices adjacent thereto. Accordingly, the FCC of the United States, for example, has promulgated a FCC part 15 subpart A, class A standard that defines the maximum acceptable radiated EMI emissions for electronic devices falling under class A classification. Compliance with this or a similar standard such as the CISPR 22 class A standard, meaning that exhibited EMI emissions for a given electronic device such as a network component will not exceed the defined class A threshold, is desirable in order to maximize potential placement and use of the subject network component within a network, and therefore, maximize its flexibility and value to potential customers. In the past, such network components have incorporated conventional shielded connections to keep radiated EMI to a minimum to comply to these standards.

However, as alluded to above, cost considerations have forced network component designers to forgo shielded connections where possible to keep their components price competitive and compatible with the broadcast array of connection and interfacing gear. Therefore, alternative ways of reducing EMI must be explored.

SUMMARY

In general, according to one embodiment of the invention, a conductive shield includes a first portion to contact and establish an electrical connection with a modular connector and a second portion. The second portion electrically couples the first portion to communicate with ground of a circuit board to shunt EMI from the modular connector.

In general, according to another embodiment of the invention, a system includes a circuit board, a modular connector and an EMI shield. The circuit board includes a groundplane and a groundpad that is electrically coupled to the groundplane. The EMI shield includes a first portion to contact and establish an electrical connection with the modular connector. Another portion of the EMI shield contacts the groundpad to electrically couple the first portion to the groundpad to shunt EMI from the modular connector.

The advantages of the above-described arrangements may include one or more of the following. These arrangements may provide a cost effective way to shield EMI from a modular connector, such as a network connector, for example. These arrangements may facilitate assembly of modular connectors onto circuit boards. EMI emissions may be reduced. Assembly time may be minimized.

Other features and advantages will become apparent from the following description, from the drawings and from the claims.

DETAILED DESCRIPTION

Figure 1:
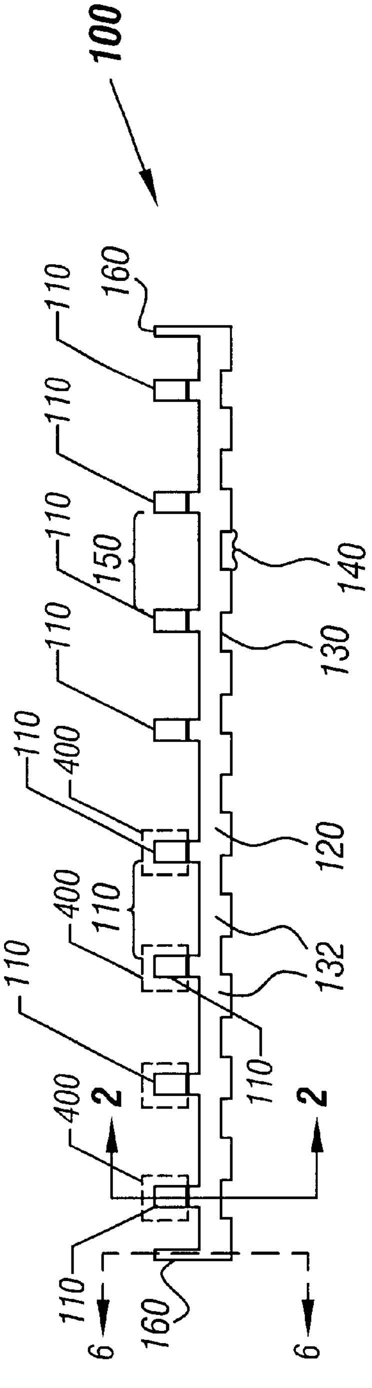
FIG. 1 depicts a top view of an EMI shield according to an embodiment of the invention.
Figure 3:
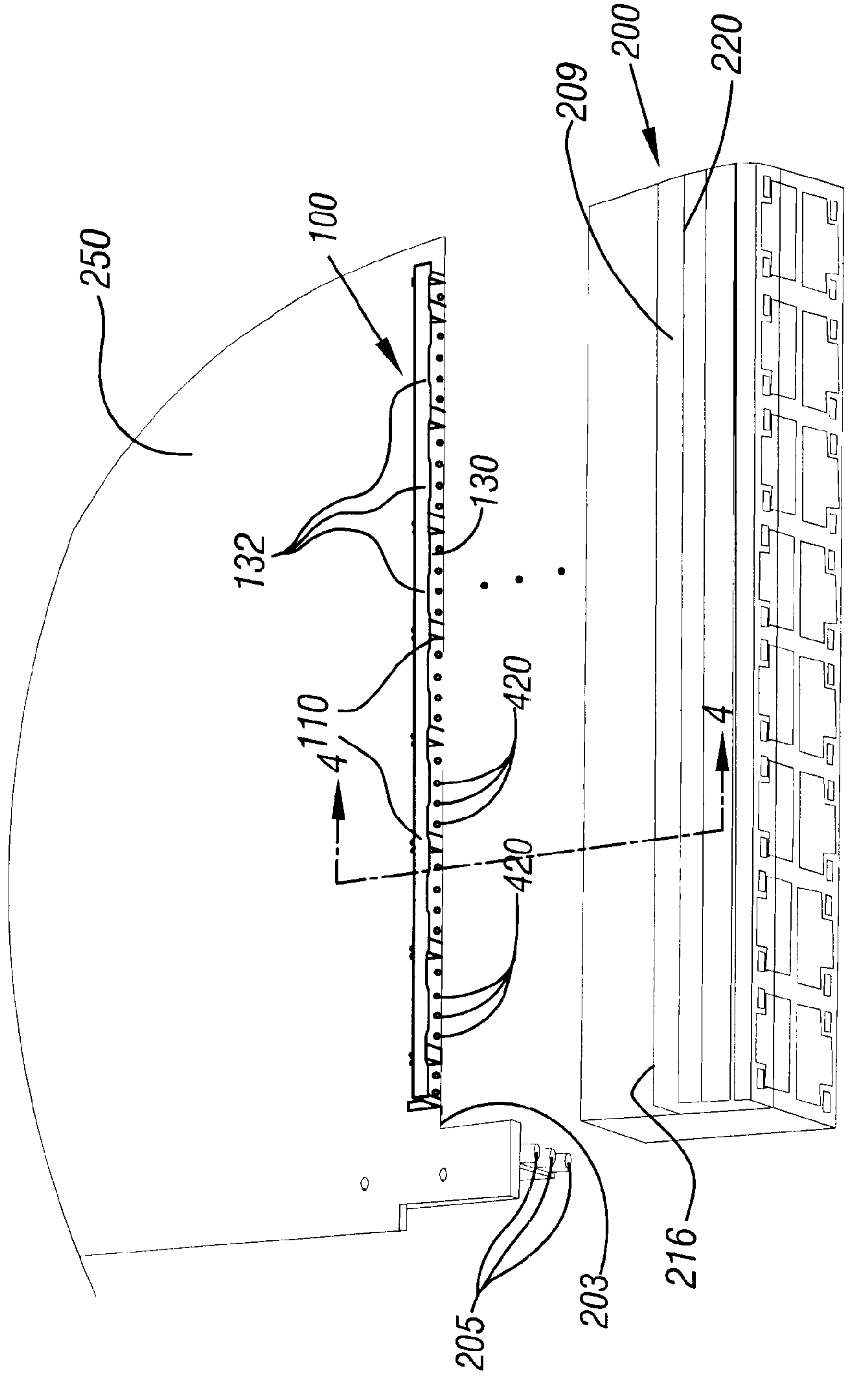
FIG. 3 is an exploded perspective view of an assembly that includes the shield and a connector according to an embodiment of the invention.

Referring to FIGS. 1 and 3, an embodiment 100 of an EMI shield in accordance with the invention includes features to facilitate the mounting of a modular connector 200 to a printed circuit board 250 and establish electrical contact between a conductive outer surface of the connector 200 and circuitry of the printed circuit board 250 for purposes of reducing EMI emissions from the connector 200. In this manner, the EMI shield 100 may be located along an edge 203 of the printed circuit board 250 and may be designed to temporarily mount the connector 200 to the printed circuit board 250 before wavesoldering is performed to solder electrical pins of the connector 200 to the printed circuit board 250. In addition to serving as an aid to attach the connector 200 to the printed circuit board 250, the EMI shield 100 may also be used to electrically couple the connector 200 to circuitry of the printed circuit board 250. For example, the EMI shield 100 may couple the connector 200 to ground (digital ground, for example) of the printed circuit board 250 for purposes of shunting EMI from the connector 200.

Figure 4:
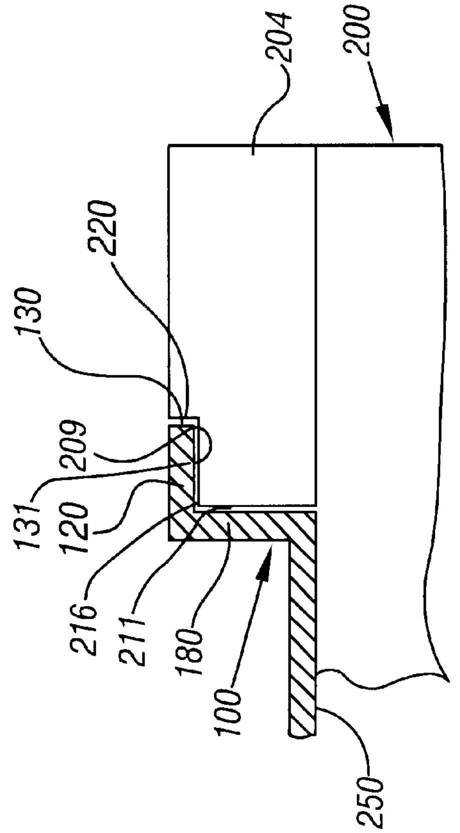
FIG. 4 is a cross-sectional view of the EMI shield and connector assembly taken along line 4—4 of FIG. 3.

More particularly, referring also to a cross-sectional view of the connector 200 and EMI shield 100 assembly that is depicted in FIG. 4, in some embodiments of the invention, the EMI shield 100 forms an angled clip-type connection for receiving an edge 216 of the connector 200. In this manner, a surface 131 of the EMI shield 100 contacts a corresponding conductive surface 209 of the connector 200 to both hold the connector 200 to the printed circuit board 250 and establish electrical connection with an outer housing of the connector 200. The connector 200 is held to the printed circuit board 250 due to the lateral force that is exerted by the EMI shield 100 on the pins (of the connector 200) that extend through vias 420 (see FIG. 3) of the printed circuit board 250

Figure 2:
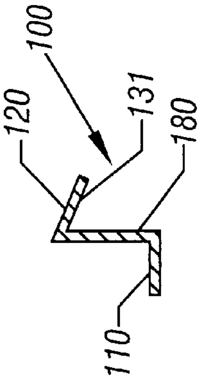
FIG. 2 depicts a cross-sectional view of the EMI shield taken along line 2—2 of FIG. 1.

The surface 131 is the underlying surface of a portion 120 (of the EMI shield 100) that is parallel to the edge 203 of the printed circuit board 250 and is connected to circuit board tabs 110 (see FIG. 1) of the EMI shield 100 via upstanding members 180, as depicted in a cross-section of the shield 100 in FIG. 2. As described further below, the tabs 110 both support the EMI shield 100 on the printed circuit board 250 and electrically connect the EMI shield 100 to the printed circuit board 250.

Referring to FIGS. 2 and 4, the upstanding members 180 and the overhanging portion 120 form acute angles to receive the edge 216 of the connector 200. Due to this arrangement, when the connector 200 is inserted into the EMI shield 100, the portion 120 is flexed into position to form an approximate ninety degree angle channel with the upstanding members 180 to receive the edge 216. Due to the resiliency of the material that forms the EMI shield 100, when the connector 200 is inserted into the EMI shield 100, the portion 120 deflects to conform to the surface 209, as depicted in FIG. 4. In this manner, when the EMI shield 100 receives the connector 200, the upstanding members 180 contact an upstanding face 211 (of the connector 200) that is generally orthogonal to the printed circuit board 200, and the overhanging portion 120 of the EMI shield 100 contacts the surface 209. Thus, the EMI shield 100 forms a substantially contoured fit with the edge 216. In some embodiments of the invention, the surface 209 is generally parallel to the printed circuit board 200, and in some embodiments of the invention, the face 209 is recessed to form a shoulder 220 that abuts an outer edge 130 of the portion 120.

Referring back to FIG. 1, the tabs 110 may be soldered to groundpads 400 of the printed circuit board 250 to establish an electrical connection between the connector 200 and a groundplane of the printed circuit board 250. As shown, the tabs 110 extend along the surface of the printed circuit board 250 to both electrically connect the EMI shield 100 to circuitry of the printed circuit board 250 and firmly anchor the EMI shield 100 to the printed circuit board 250 after wavesoldering occurs. Due to the design limitations imposed by, for example, the pin-through vias 420 (see FIG. 4) that are used in this embodiment to assist in securing the connector 200 to the circuit board 250 and electrically coupling the signaling traces (not shown) of the circuit board 250 to corresponding signaling pins (not shown) or status lights (not shown) of the connector 200, the tabs 110 are spaced apart at regular intervals 150 to allow room for the vias 420 that extend in between. In this manner, the groundpads 400 (see FIG. 1) extend between the vias 420 to meet the tabs 110. It should be appreciated, however, that in accordance with the present invention, the exact number, length and positioning of the tabs 110 is not dispositive as long as a ground path, preferably a substantially non-circuitous conductive path, can be established between the outer surface of the connector 200 and the electrical ground of the printed circuit board 250 to shunt and dissipate EMI otherwise radiating outwardly from the connector 200.

Figure 5:
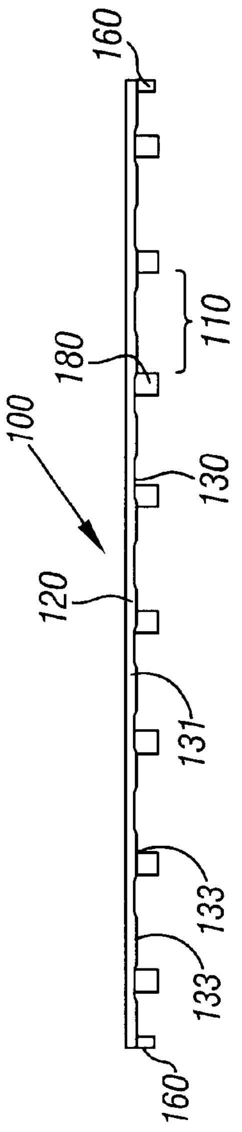
FIG. 5 is a front view of the EMI shield according to an embodiment of the invention.

As depicted in FIG. 1, in some embodiments of the invention, the outer edge 130 of the EMI shield 100 is serrated to enhance a friction fit between the EMI shield 100 and the connector 200 and to accommodate variation in the straightness of the shoulder 220 (see FIG. 4). In this manner, in some embodiments of the invention, the edge 130 includes extensions 132 that are spaced at regular intervals 140. Referring to a front view of the EMI shield 100 that is depicted in FIG. 5, in some embodiments of the invention, the bottom surface 131 of the overhanging portion 120 of the EMI shield 100 may also be serrated to accommodate variations in the flatness of the surface 209 of the connector 200 and to enhance a friction fit between the EMI shield 100 and the surface 209.

Figure 6:
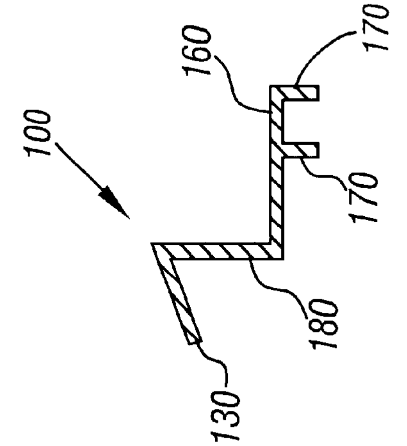
FIG. 6 is a cross-sectional view of the EMI shield taken along line 6—6 of FIG. 1.

Referring back to FIG. 1, in some embodiments of the invention, the EMI shield 100 may have features to temporarily hold the EMI shield 100 to the printed circuit board 250 before wavesoldering is used to solder the tabs 110 (and EMI shield 100) to the printed circuit board 250. For example, in some embodiments of the invention, at the longitudinal. ends of the shield 100 are disposed pin-thru stabilizer tabs 160 to secure the shield 100 to the printed circuit board 250 through either compression, friction or solder fitting employing the use of stabilizer pins 170, as depicted in FIG. 6.

In some embodiments of the invention, the connector 200 may include at least a conductive portion 204 (see FIG. 4) that contacts the EMI shield 100 to form an electrical connection between the connector body and the circuitry of the printed circuit board 250. As an example, the connector 200 may be an Ethernet modular connector that is available from AMP electronics for use in high-speed 100 BaseT and 1000 BaseT Ethernet connections. As an example, the connector 200 may be a 2×8 connector.

As an example, in some embodiments of the invention, the EMI shield 100 may be made from a conductive material. As examples, this conductive material may be tinned aluminum, gold, silver or copper or any other material that is suitable for shunting EMI from the connector 200.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A conductive shield comprising:

a clamp adapted to exert a force on a modular connector to press the modular connector against a circuit board and establish an electrical connection with the modular connector; and a second portion electrically coupled to the clamp to communicate with a ground of the circuit board to shunt EMI from the modular connector.

2. The conductive shield of claim 1, wherein the clamp comprises a serrated edge adapted to contact an edge of the modular connector.

3. The conductive shield of claim 2, wherein the serrated edge comprises regularly spaced extensions adapted to contact the edge of the connector.

4. The conductive shield of claim 1, wherein the second portion comprises tabs spaced apart to permit pins of the connector to extend between the tabs.

5. The conductive shield of claim 1, further comprising:

stabilizer tabs adapted to hold the conductive shield to the printed circuit board.

6. The conductive shield of claim 1, wherein the clamp comprises a serrated surface adapted to contact a surface of the modular connector.

7. The conductive shield of claim 1, wherein the modular connector comprises an Ethernet connector.

8. The conductive shield of claim 1, wherein the clamp is adapted to form a substantially contoured fit with an edge of the connector.

9. A system comprising:

a circuit board comprising a groundplane and a groundpad electrically coupled to the groundplane;

a modular connector; and an EMI shield comprising:

a clamp adapted to exert a force on a modular connector to press the modular connector against a circuit board and establish an electrical connection with the modular connector; and another portion contacting the groundpad to electrically couple the clamp to the groundpad to shunt EMI from the modular connector.

10. The system of claim 9, wherein the clamp comprises a serrated edge adapted to contact an edge of the modular connector.

11. The system of claim 10, wherein the serrated edge comprises regularly spaced extensions adapted to contact the edge of the connector.

12. The system of claim 9, wherein the second portion comprises tabs spaced apart to permit pins of the connector to extend between the tabs.

13. The system of claim 9, further comprising:

stabilizer tabs adapted to hold the EMI shield to the printed circuit board.

14. The system of claim 9, wherein the clamp comprises a serrated surface adapted to contact a surface of the modular connector.

15. The system of claim 9, wherein the modular connector comprises an Ethernet connector.

16. The system of claim 9, wherein the clamp is adapted to form a substantially contoured fit with an edge of the connector.

17. A conductive shield comprising:

first means for exerting a force on a modular connector to press the modular connector against a circuit board and establishing an electrical connection with the modular connector; and second means for electrically coupling the modular connector to a ground of the circuit board to shunt EMI from the modular connector.

18. The conductive shield of claim 17, wherein the first means comprises a serrated edge adapted to contact an edge of the modular connector.

19. The conductive shield of claim 18, wherein the serrated edge comprises regularly spaced extensions adapted to contact the edge of the connector.

20. The conductive shield of claim 17, wherein the second means comprises tabs spaced apart to permit pins of the connector to extend between the tabs.

21. The conductive shield of claim 17, further comprising:

means for holding the conductive shield to the printed circuit board before soldering.

22. The conductive shield of claim 17, wherein the first means comprises a serrated surface adapted to contact a surface of the modular connector.

23. The conductive shield of claim 17, wherein the modular connector comprises an Ethernet connector.

24. The conductive shield of claim 17, wherein the first and second means are adapted to form a substantially contoured fit with an edge of the connector.

* * * * *